(12) United States Patent
Malmin

(10) Patent No.: US 8,115,172 B2
(45) Date of Patent: Feb. 14, 2012

(54) POSITION-WEIGHTED LOCATION OF SCINTILLATION EVENTS

(75) Inventor: Ronald E. Malmin, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 54 days.

(21) Appl. No.: 12/568,432

(22) Filed: Sep. 28, 2009

(65) Prior Publication Data

US 2010/0078567 A1    Apr. 1, 2010

Related U.S. Application Data

(60) Provisional application No. 61/100,342, filed on Sep. 26, 2008.

(51) Int. Cl.
*G01T 1/20* (2006.01)

(52) U.S. Cl. .................................. 250/363.02; 250/366

(58) Field of Classification Search ............. 250/363.02, 250/363.07, 363.09, 366, 369
See application file for complete search history.

(56) References Cited

U.S. PATENT DOCUMENTS

| | | | |
|---|---|---|---|
| 6,723,993 B2 * | 4/2004 | Cooke et al. ................... | 250/369 |
| 6,956,215 B2 * | 10/2005 | Stark et al. ..................... | 250/369 |
| 2003/0116713 A1 * | 6/2003 | Cooke et al. ................... | 250/369 |
| 2004/0056203 A1 * | 3/2004 | Stark et al. ..................... | 250/369 |

* cited by examiner

*Primary Examiner* — Mark R Gaworecki
(74) *Attorney, Agent, or Firm* — Peter L. Kendall

(57) ABSTRACT

Determining a scintillation event location $b_{event}$ along an axis B of an array of photomultiplier tubes, each photomultiplier tube having a location $b_{PMT}$ and an output $Z_{PMT}$. Determining a preliminary event location $b_{prelim}$ along the B axis as a centroid of the photomultiplier tube outputs. Determining a position-weighted characteristic $(Z_{PMT} \cdot (b_{PMT}-b_{prelim})^2)$ of each of the photomultiplier tubes. Determining event location $b_{event}$ along the B axis as a centroid of the outputs of those photomultiplier tubes characterized by a position-weighted characteristic less than or equal to a predetermined cutoff.

6 Claims, 3 Drawing Sheets

POSITION-WEIGHTED LOCATION OF SCINTILLATION EVENTS

CROSS REFERENCE TO RELATED APPLICATIONS

The present application claims the priority benefit of U.S. Provisional Patent Application No. 61/100,342 titled "Position-Dependent Thresholding of Gamma Camera Signals," filed Sep. 26, 2008; the complete disclosure of which is hereby incorporated herein by reference in its entirety.

BACKGROUND

A gamma camera is a device used to image gamma radiation emitting radioisotopes, a technique known as scintigraphy. Applications of scintigraphy include early drug development and nuclear medical imaging to view and analyze images of the human body or the distribution of medically injected, inhaled, or ingested radionuclides emitting gamma rays.

A gamma camera consists of one or more flat crystal planes (or detectors) optically coupled to an array of photomultiplier tubes, the assembly is known as a "head", mounted on a gantry. The gantry is connected to a data processing system that both controls the operation of the camera as well as acquisition and storage of acquired images.

The system accumulates events, or counts, of gamma photons that are absorbed by the crystal in the camera. Usually a large, e.g., 40 cm×50 cm, flat crystal of sodium iodide with thallium doping in a light-sealed housing is used.

The crystal scintillates in response to incident gamma radiation. When a gamma photon leaves the patient (who has been injected with a radioactive pharmaceutical), it knocks an electron loose from an iodine atom in the crystal, and a large number of light photons, is produced when the dislocated electron again finds a minimal energy state. The initial phenomenon of the excited electron is similar to the photoelectric effect and (particularly with gamma rays) the Compton effect. After the light photons are produced, they are detected, e.g., a detected event. Photomultiplier tubes (PMTs) behind the crystal detect the photons and a computer sums the counts. The computer reconstructs and displays a two dimensional image of the relative spatial count density on a monitor. This reconstructed image reflects the distribution and relative concentration of radioactive tracer elements present in the organs and tissues imaged.

SUMMARY

The technology includes systems, methods, and computer program products for determining a scintillation event location along an axis of an array of photomultiplier tubes. Each photomultiplier tube has a location in the array and an output upon detecting an event. Methods of the technology determine a preliminary event location along the axis as a centroid of the photomultiplier tube outputs, determine a position-weighted characteristic of each of the photomultiplier tubes, and then determine event location along the axis as a centroid of the outputs of those photomultiplier tubes characterized by a position-weighted characteristic less than or equal to a predetermined cutoff.

Some embodiments include identifying a subset the photomultiplier tubes as those photomultiplier tubes having an output greater then a predetermined threshold before determining a preliminary location.

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one embodiment can be used on another embodiment to yield a still further embodiment. Thus, it is intended that the present technology cover such modifications and variations that come within the scope of the technology.

The total energy of an event can be considered to be the sum of the light energy collected in all PMTs, e.g., a function of $Z_{total}$. The event location, e.g., $\{x_{event}, y_{event}\}$, in the plane of the array of PMTs, can be determined by a centroid, e.g., a weighted centroid, of the output signals (representative of energy) of a subset of the PMTs. The choice of which PMTs to use in the position calculation can be influenced by the fact that the magnitude of signal decreases rapidly as distance of the photomultipliers from the scintillation event increases, with a corresponding increase in noise, e.g., Poisson noise. Typically, PMT signals below some fraction of the total energy are omitted from the calculation. In determining event location, the technology can consider one axis at a time, in part because the PMTs included in the position calculation for one axis may not be the same PMTs included in the position calculation for the other axis.

The event position along an axis, e.g., X axis and Y axis, of the PMT array is a function of the output energy Z at each PMT used in the calculation and the location of the each such PMT along that axis.

For example, consider the calculation of event position along the X axis of a PMT array. Error propagation yields the following expression for variance in position x along the X axis:

$$\sigma^2(x) \approx \Sigma_i \sigma^2(Z_i) \cdot (x_i - x)^2 / Z_{total}^2 \quad (1)$$

$$\sigma^2(x) \sim \Sigma Z'_i \cdot \Delta x_i^2 \quad (2)$$

where $\Delta x_i = (x_i - x)$, $Z'_i = Z_i / Z_{total}$ is the fractional energy of $i^{th}$ PMT.

That is, the variance of the calculated event position along the X axis is proportional to the signal $Z'_i$ (which is related to energy and the number of photons captured by the $i^{th}$ PMT) weighted by the square of the distance from the event along the X axis to the $i^{th}$ PMT. Limiting the value of $(Z' \cdot \Delta x^2)$ can provide a signal threshold for determining position along the X axis.

Figure 1:
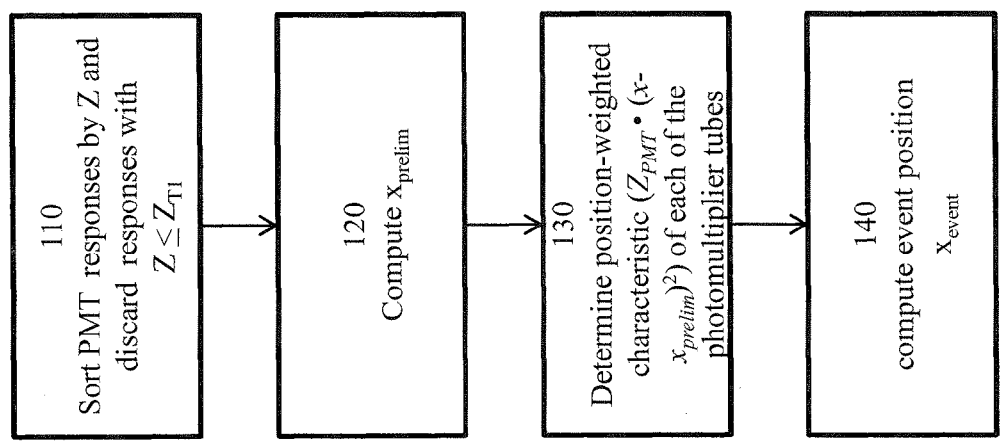
FIG. 1 illustrates a method of the technology.

Referring to FIG. 1, in some embodiments a precursor subset of the PMT responses is created at least in part by sorting PMT responses by energy and discarding those responses below a first threshold $Z_{T1}$ 110. This approach is primarily (though not exclusively) an accommodation to real-time processing resources in place in a typical gamma camera system. In such embodiments a very low first threshold, e.g., $Z_{T1} = 0.0075(Z_{total})$ can be used.

Figure 2:
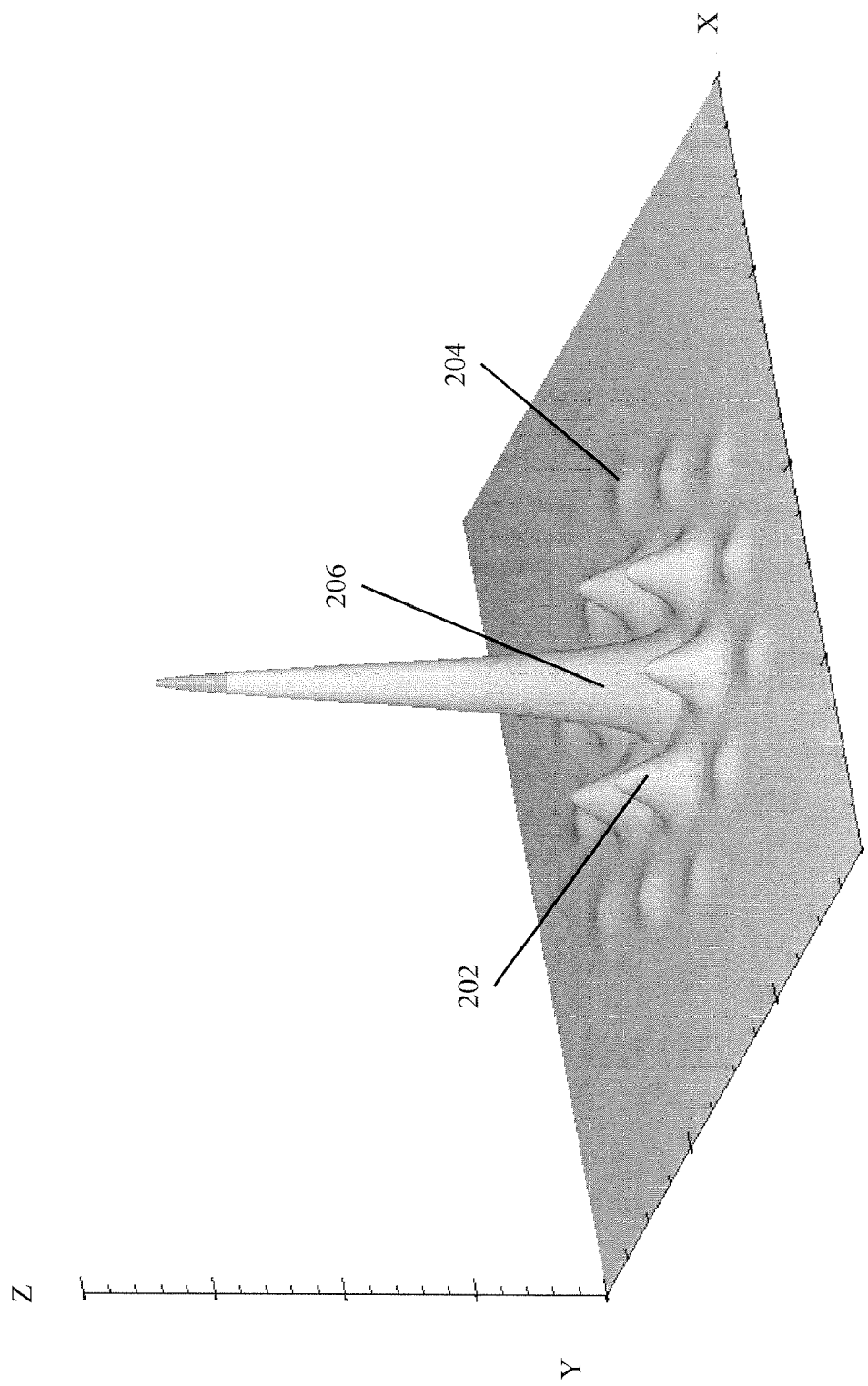
FIG. 2 illustrates a distribution of PMT signals.

FIG. 2 is an illustration of a distribution of PMT signals (Z axis) in two rings 202, 204 around a center signal 206. For the purpose of further disclosure, it can be assumed that the nineteen (19) responses depicted are a precursor subset of PMT responses as described above.

The technology computes a preliminary position, $x_{prelim}$, 120 based on a centroid of a first subset of the precursor PMT responses. In some embodiments, the subset consists of those PMTs having output signal energy $Z_i$ greater than or equal to a second threshold $Z_{T2}$. In other embodiments, the first subset consists of the first N highest-energy PMT responses. In still other embodiments, a double-condition threshold based on up to the first N highest-energy PMT responses above $Z_{T2}$ is used.

The technology determines the position-weighted response $(Z'_i \cdot (x_i - x_{prelim})^2)$ for each PMT in the first subset 130. The technology then computes event position $x_{event}$ 140 as a centroid of those PMT responses where $(Z' \cdot (x - x_{prelim})^2)$ is greater than or equal to a threshold $(Z' \cdot \Delta x^2)_{cutoff}$.

Figure 3:
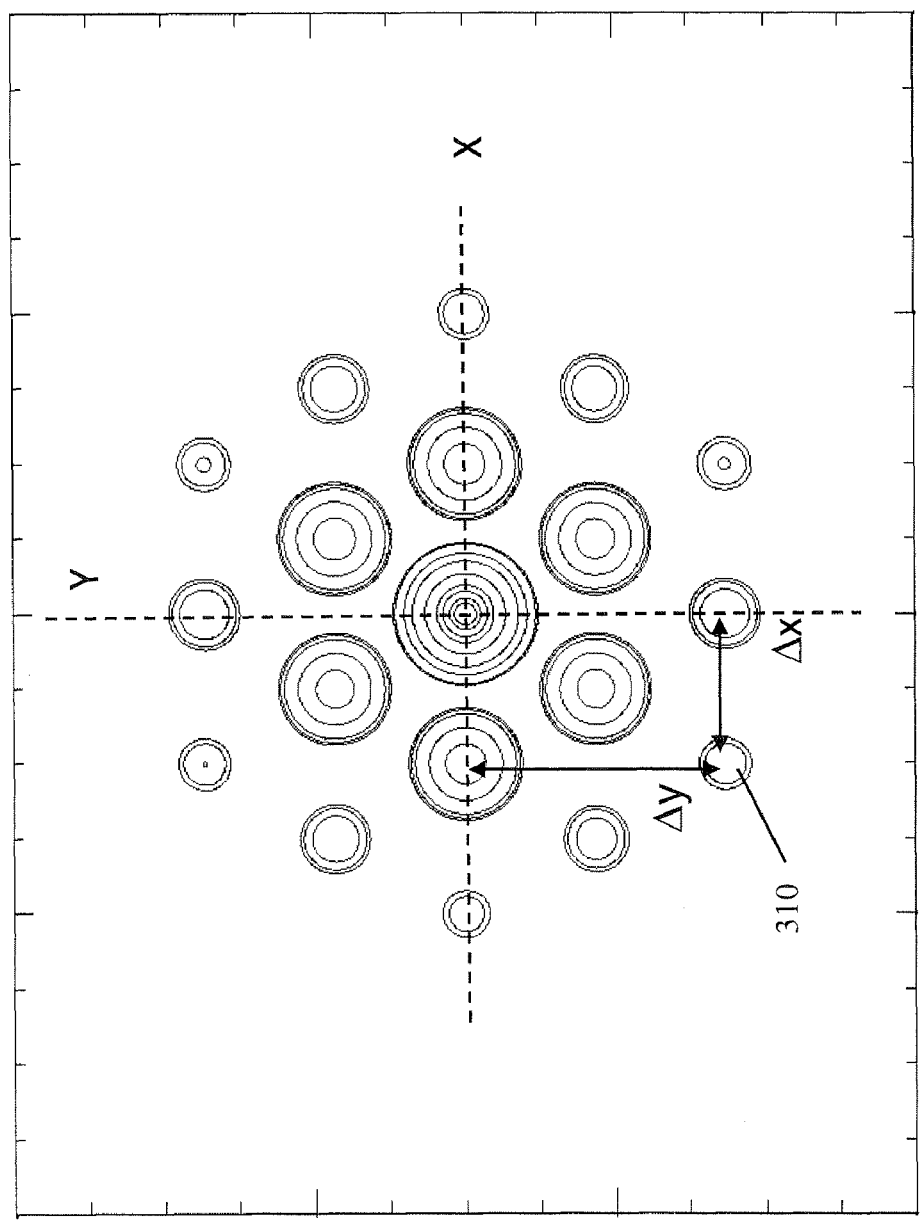
FIG. 3 illustrates a distribution of PMT signals.

FIG. 3 is another representation of the distribution of FIG. 2 illustrating how one response 310 of the nineteen (19) responses can be included in calculation of $x_{event}$, yet not included in the calculation of $y_{event}$, if $(Z' \cdot \Delta x^2)$ is less than $Z' \cdot \Delta x^2)_{cutoff}$ and $(Z' \cdot \Delta y^2)$ is greater than $(Z' \cdot \Delta y_2)_{cutoff}$—even if $(Z' \cdot \Delta x^2)_{cutoff} = (Z' \cdot \Delta y^2)_{cutoff}$.

Gamma camera systems can take the form of hardware and software elements. In some embodiments, the technology is implemented in a gamma camera system in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A gamma camera data processing system suitable for storing program code and for executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. In a scintographic imaging system, a method performed by a processor for determining a scintillation event location $b_{event}$ along an axis B of an array of photomultiplier tubes, each photomultiplier tube having a location $b_{PMT}$ and an output $Z_{PMT}$, the method comprising:
   determining a preliminary event location $b_{prelim}$ along the B axis as a centroid of the photomultiplier tube outputs;
   determining a position-weighted characteristic $(Z_{PMT} \cdot (b_{PMT} - b_{prelim})^2)$ of each of the photomultiplier tubes;
   determining event location $b_{event}$ along the B axis as a centroid of the outputs of those photomultiplier tubes characterized by a position-weighted characteristic less than or equal to a predetermined cutoff.

2. In a scintographic imaging system, a method performed by a processor for determining a scintillation event location $b_{event}$ along an axis B of an array of photomultiplier tubes, each photomultiplier tube having a location $b_{PMT}$ and an output $Z_{PMT}$, the method comprising:
   identifying a subset the photomultiplier tubes as those photomultiplier tubes having an output greater then a predetermined threshold;
   determining a preliminary event location $b_{prelim}$ along the B axis as a centroid of the outputs of the subset;
   determining a position-weighted characteristic $(Z_{PMT} \cdot (b_{PMT} - b_{prelim})^2)$ of each photomultiplier tube in the subset;
   determining event location $b_{event}$ along the B axis as a centroid of the outputs of those photomultiplier tubes characterized by the position-weighted characteristic less than or equal to a predetermined cutoff.

3. In a scintographic imaging system, a method performed by a processor for determining a scintillation event location $\{x_{event}, y_{event}\}$ in the plane XY of an array of photomultiplier tubes, each photomultiplier tube having an location $\{x_{PMT}, y_{PMT}\}$ and an output $Z_{PMT}$, the method comprising:
   identifying a subset the photomultiplier tubes as those photomultiplier tubes having an output greater then a predetermined threshold;
   determining $x_{event}$ by:
      determining a preliminary event location $X_{prelim}$ along the X axis as a centroid of the outputs of the subset;
      determining an X axis position-weighted characteristic $(Z_{PMT} \cdot (x_{PMT} - x_{prelim})^2)$ of each of the photomultiplier tubes in the subset; and
      determining event location $x_{event}$ along the X axis as a centroid of the outputs of those photomultiplier tubes characterized by the X axis position-weighted characteristic less than or equal to a predetermined X axis cutoff; and
   determining $y_{event}$ by:
      determining a preliminary event location $y_{prelim}$ along the Y axis as a centroid of the outputs of the subset;
      determining a Y axis position-weighted characteristic $(Z_{PMT} \cdot (y_{PMT} - y_{prelim})^2)$ of each of the photomultiplier tubes in the subset; and
      determining event location $y_{event}$ along the Y axis as a centroid of the outputs of those photomultiplier tubes characterized by the Y axis position-weighted characteristic less than or equal to a predetermined Y axis cutoff.

4. In a scintography system comprising a data processing system, a non-transitory computer program product for determining a scintillation event location $b_{event}$ along an axis B of an array of photomultiplier tubes, each photomultiplier tube having a location $b_{PMT}$ and an output $Z_{PMT}$, the system comprising:
- a non-transitory computer-readable medium;
- program code,
  - stored on the medium, and
  - operable upon execution by the data processing system to:
    - determine a preliminary event location $b_{prelim}$ along the B axis as a centroid of the photomultiplier tube outputs;
    - determine a position-weighted characteristic $(Z_{PMT} \cdot (b_{PMT} - b_{prelim})^2)$ of each of the photomultiplier tubes;
    - determine event location $b_{event}$ along the B axis as a centroid of the outputs of those photomultiplier tubes characterized by a position-weighted characteristic less than or equal to a predetermined cutoff.

5. In a scintography system comprising a data processing system, a non-transitory computer program product for determining a scintillation event location $b_{event}$ along an axis B of an array of photomultiplier tubes, each photomultiplier tube having a location $b_{PMT}$ and an output $Z_{PMT}$, the system comprising:
- a non-transitory computer-readable medium;
- program code,
  - stored on the medium, and
  - operable upon execution by the data processing system to:
    - identify a subset the photomultiplier tubes as those photomultiplier tubes having an output greater then a predetermined threshold;
    - determine a preliminary event location $b_{prelim}$ along the B axis as a centroid of the outputs of the subset;
    - determine a position-weighted characteristic $(Z_{PMT} \cdot (b_{PMT} - b_{prelim})^2)$ of each photomultiplier tube in the subset;
    - determine event location $b_{event}$ along the B axis as a centroid of the outputs of those photomultiplier tubes characterized by the position-weighted characteristic less than or equal to a predetermined cutoff.

6. In a scintography system comprising a data processing system, a non-transitory computer program product for determining a scintillation event location $\{x_{event}, y_{event}\}$ in the plane XY of an array of photomultiplier tubes, each photomultiplier tube having a location $\{x_{PMT}, y_{PMT}\}$ and an output $Z_{PMT}$, the system comprising:
- a non-transitory computer-readable medium;
- program code,
  - stored on the medium, and
  - operable upon execution by the data processing system to:
    - identify a subset the photomultiplier tubes as those photomultiplier tubes having an output greater then a predetermined threshold;
    - determine $x_{event}$ by:
      - determine a preliminary event location $x_{prelim}$ along the X axis as a centroid of the outputs of the subset;
      - determine an X axis position-weighted characteristic $(Z_{PMT} \cdot (x_{PMT} - x_{prelim})^2)$ of each of the photomultiplier tubes in the subset; and
      - determine event location $x_{event}$ along the X axis as a centroid of the outputs of those photomultiplier tubes characterized by the X axis position-weighted characteristic less than or equal to a predetermined X axis cutoff; and
    - determine $y_{event}$ by:
      - determine a preliminary event location $y_{prelim}$ along the Y axis as a centroid of the outputs of the subset;
      - determine a Y axis position-weighted characteristic $(Z_{PMT} \cdot (y_{PMT} - y_{prelim})^2)$ of each of the photomultiplier tubes in the subset; and
      - determine event location $y_{event}$ along the Y axis as a centroid of the outputs of those photomultiplier tubes characterized by the Y axis position-weighted characteristic less than or equal to a predetermined Y axis cutoff.

* * * * *